S. FRISBIE & H. C. HART.

Improvement in Animal Traps.

No. 125,449. Patented April 9, 1872.

Witnesses.
C. A. Shepard.
Chas E. Rice

Inventor.
Samuel Frisbie 2nd Hubert C. Hart,
By James Shepard Atty.

125,449

UNITED STATES PATENT OFFICE.

SAMUEL FRISBIE AND HUBERT C. HART, OF UNIONVILLE, CONNECTICUT.

IMPROVEMENT IN ANIMAL-TRAPS.

Specification forming part of Letters Patent No. 125,449, dated April 9, 1872; antedated March 25, 1872.

*To all whom it may concern:*

Be it known that we, SAMUEL FRISBIE and HUBERT C. HART, of Unionville, in the county of Hartford and State of Connecticut, have invented certain new and useful Improvements in Animal-Traps, of which the following is a specification.

Our improvement consists in the peculiar construction and arrangement of the spring and latch, as herein described.

Figure 1:
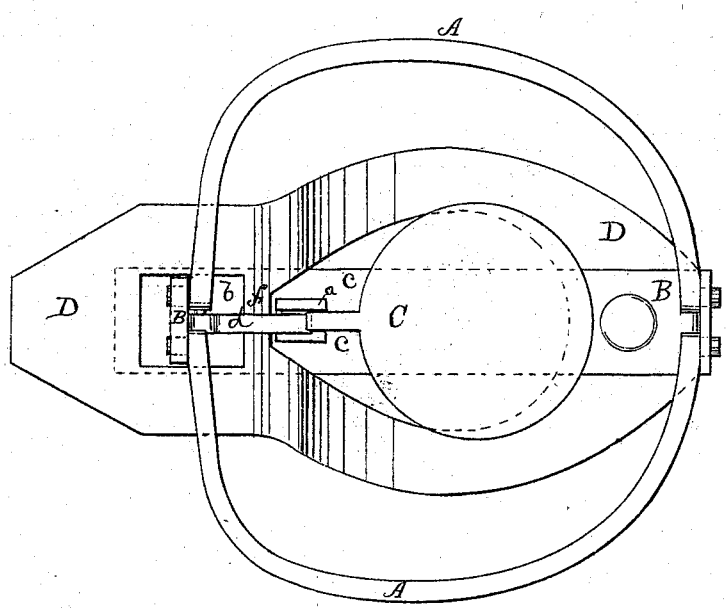
Figure 2:
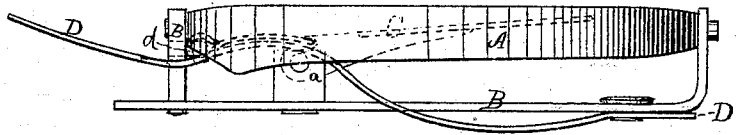
Figure 3:
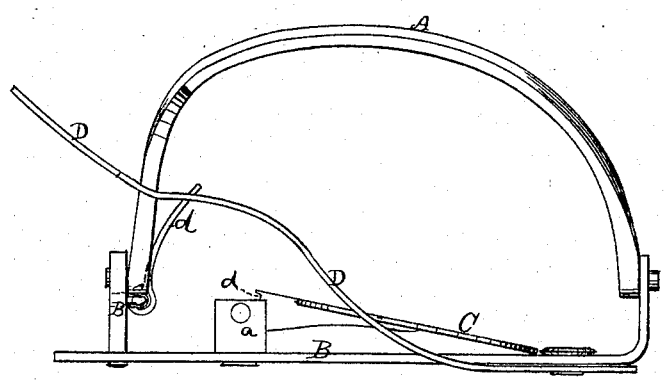

In the accompanying drawing, Figure 1 is a top view of a trap embodying our invention, and Figs. 2 and 3 are side elevations of the same.

The position of the parts when the trap is set is shown in Figs. 1 and 2, and their position when sprung is shown in Fig. 3.

A A designate jaws of ordinary form, which are hung in the usual manner in the frame B.

The ordinary pan C is hung upon the stud $a$, and attached to the frame B. D designates the spring, which has an opening, $b$, near one end, through which the jaws A A and latch $d$ are passed, the spring operating to close the jaws as in the ordinary trap. Inside of the jaws A A and the opening $b$ is another opening, $c$, through which the frame B and pan C are passed, and one end of the spring D secured to the under side of the frame B. Immediately below and centrally with the hinges of the jaws A A, the latch $d$ is hung or hinged to the frame B. The opening $c$ of the spring D is so large as to allow the pan C to operate freely therein, and the portion of said spring between the openings $c$ and $b$ forms a bar, $f$, Fig. 1, over which the latch $d$ passes and engages with the notch $d$ (Fig. 3) in the pan C, and thereby holds the spring D depressed, so that the jaws A A may be thrown open and the trap set, as shown in Figs. 2 and 3. As in the ordinary trap the depression of the pan C will release the latch $d$ and spring D, and close the jaws, as shown in Fig. 3. The portion of the spring on the sides of the opening $c$ is widened so as to give it the requisite strength, and also when the spring is secured to the under side of the frame B, as shown, to form a support for the trap to rest on, causing it to stand firm without any inclination to tip from side to side. It will also be observed that, placing the spring under the frame so that it forms the base near the center of the trap, it will have the tendency, when sprung, to throw the whole trap upward toward the animal which springs it, and therefore give greater surety of grasping the animal with a firm hold than does the ordinary trap. If desired, the spring D might be secured to the top of the frame B, when the pan would be passed through the opening $c$, and operate, in connection with the latch and spring, in the manner described; but it is preferable to pass the frame through the spring and secure it on the under side thereof, as shown, whereby it forms the base of the trap. In order to secure the spring to the under side of the frame, the parts may be reversed by widening the frame and providing it with an opening, when the spring would be passed through the frame and secured, substantially as before described. By our improvement the spring, which in most traps performs a single office only, is made to perform four distinct offices—viz., to operate the jaws, to form the bar over which the latch passes in setting, to form a base for the trap to rest upon, and to throw the trap upward, as before described.

We claim as our invention—

1. The improved construction of the spring D, provided with the opening $c$, through which the pan C is arranged to operate, in the manner described.

2. The combination and arrangement of the latch $d$ and the bar $f$ formed on the spring D, connected and operating with the other parts of the trap, substantially as and for the purpose described.

3. A trap in which the spring D is fastened to the frame B upon the under side of said frame, by means of passing the frame B through the opening $c$ in the widened spring D, or vice versa, all substantially as and for the purpose described.

SAMUEL FRISBIE.
HUBERT C. HART.

Witnesses:
HENRY N. HATCH,
W. W. PINNEY.